United States Patent
Roser et al.

(10) Patent No.: US 8,783,616 B2
(45) Date of Patent: Jul. 22, 2014

(54) LOADS INTERFACE, PARTICULARLY A LOADS INTERFACE FOR A PLUG TYPE AIRCRAFT DOOR

(75) Inventors: Tim Roser, Donauworth (DE); Kamran Rah, Augsburg (DE); Christian Steppich, Adelsried (DE)

(73) Assignee: Airbus Helicopters Deutschland GmbH, Donauwoerth (DE)

( * ) Notice: Subject to any disclaimer, the term of this patent is extended or adjusted under 35 U.S.C. 154(b) by 187 days.

(21) Appl. No.: 13/553,309

(22) Filed: Jul. 19, 2012

(65) Prior Publication Data

US 2013/0032661 A1 Feb. 7, 2013

(30) Foreign Application Priority Data

Aug. 1, 2011 (EP) .................................... 11400039

(51) Int. Cl.
*B64C 1/14* (2006.01)

(52) U.S. Cl.
USPC .................... 244/129.5; 244/117 R; 244/119; 244/129.4

(58) Field of Classification Search
USPC ....... 244/129.5, 117 R, 119, 129.4, 131, 127, 244/118.2
See application file for complete search history.

(56) References Cited

U.S. PATENT DOCUMENTS

| | | | | |
|---|---|---|---|---|
| 4,132,825 A * | 1/1979 | Hahn | ............................ | 267/137 |
| 7,726,602 B2 * | 6/2010 | Llamas Sandin | ............... | 244/54 |
| 7,837,148 B2 * | 11/2010 | Kismarton et al. | ......... | 244/123.1 |
| 8,418,961 B2 * | 4/2013 | De Freitas et al. | ......... | 244/129.5 |
| 8,443,575 B1 * | 5/2013 | Tanner et al. | ................. | 52/784.1 |
| 8,657,230 B2 * | 2/2014 | Woodland et al. | ......... | 244/118.1 |
| 2002/0008179 A1 * | 1/2002 | Bluem et al. | ................ | 244/129.5 |
| 2008/0164373 A1 * | 7/2008 | Roming | ..................... | 244/129.5 |
| 2009/0078826 A1 * | 3/2009 | Haensch et al. | ........... | 244/129.5 |
| 2009/0152398 A1 * | 6/2009 | Risch | ......................... | 244/129.5 |
| 2010/0219647 A1 | 9/2010 | Risch | | |
| 2010/0252682 A1 * | 10/2010 | Pahl | .......................... | 244/129.5 |
| 2010/0294888 A1 | 11/2010 | Texcier | | |
| 2012/0187247 A1 * | 7/2012 | Delgado Jareno et al. | | 244/129.5 |

FOREIGN PATENT DOCUMENTS

DE 102006054431 A1 5/2008
FR 2947241 A1 12/2010

OTHER PUBLICATIONS

Search Report and Written Opinion; Application No. EP 11400039; dated Jan. 18, 2012.

* cited by examiner

*Primary Examiner* — Christopher P Ellis
(74) *Attorney, Agent, or Firm* — Brooks Kushman P.C.

(57) ABSTRACT

A loads interface (1), particularly a loads interface (1) of an aircraft door with an edge frame (13), an outer skin (15) and a beam (14). A loads transferring flange (11) is designed to transmit transverse, circumferential and/or longitudinal forces, is provided with at least three flanges (18, 19, 20) for distribution of the loads in the edge frame (13), the outer skin (15) and the beam (14).

8 Claims, 2 Drawing Sheets

LOADS INTERFACE, PARTICULARLY A LOADS INTERFACE FOR A PLUG TYPE AIRCRAFT DOOR

CROSS REFERENCE TO RELATED APPLICATIONS

This application claims priority to EP Application No. 11 400039.1 filed Aug. 1, 2011, the disclosure of which is incorporated in its entirety by reference herein.

BACKGROUND OF THE INVENTION (1) Field of the Invention

The invention relates to an interface for the concentrated loads introduction into a grid stiffened shell-like fiber reinforced composite structure, particularly a loads interface for a plug type aircraft door with the features of the preamble of claim 1.

(2) Description of Related Art

Especially door fittings of an airplane door are used to transfer load from the door to the airplane fuselage. Said door fittings are part of the primary structure of a typical airplane door. In flight conditions internal pressure is acting on the airplane door and said internal pressure results in transversal loads as concentrated pointed loads at the corresponding contact points between the airplane door and the fuselage side. Supplemental loads rectangular to said transversal loads on the contact points result from friction and inclined door stops. Thus there exists a concentrated multi-axial loading state at the door fitting—and in particular at the load introducing contact points and said concentrated multi-axial loading state needs to be transferred to a background structure of the airplane door.

The document DE 102006054431 A1 discloses a door fitting for the mounting of doors and flaps on the fuselage structure and/or wing structure of an aircraft, with a door holder which has the bearing elements for the door or flap, and with a flange which is used for the fastening to the fuselage structure or wing structure, the door holder and flange being formed as a single part in the form of a flat-surfaced, plate-like component. This state of the art is efficient but does not provide sufficient safety margin against overstressing at the highest loaded door stops. Moreover, said state of the art is focused on pure transversal loads whereas loads in circumferential and longitudinal direction that occur in any real aircraft application cannot be transferred sufficiently in the underlying composite structure.

The document US 2010294888 A1 discloses a panel including a plurality of retainers along its lateral sides, these being intended to engage, in the closure position of the panel, with corresponding retainers located on the frame structure of this panel. The panel includes at least one beam, a longitudinal end portion of which has a slot emerging in the end face of the beam and located at a suitable position for mounting a retainer directly on this beam. The retainer includes a retaining part and a mounting part formed by a base, the mounting part forming one body with the retaining part. The mounting part and the slot are shaped such that the mounting part engages tightly in the slot and the mounting part is fastened to the beam by fastening members, particularly nuts and bolts, which are positioned approximately perpendicular to the principal direction of the beam. US 2010294888 A1 takes into account exclusively forces due to the pressurization.

BRIEF SUMMARY OF THE INVENTION

It is an objective of the invention to provide a loads interface, particularly a loads interface for a plug type aircraft door, which is optimized for reception of multi-axial concentrated loads.

The solution is provided with a loads interface, particularly a loads interface for a plug type aircraft door with the features of claim 1. Preferred embodiments of the invention are presented with the subclaims.

According to the invention a loads interface, particularly a loads interface of an aircraft structure, comprises a background structure, particularly a stiffened shell-like background structure, with a beam, an edge-frame component and a shell-like outer skin, preferably made from fiber reinforced plastics, said edge frame being adapted to said beam and said outer skin. Said beam is angled with regard to said outer skin and said edge-frame like component and said outer skin is angled with regard to said edge frame like component. A loads transferring flange is adapted and mounted to said edge frame like component, said beam and to said outer skin. Said loads transferring flange is designed to transmit transverse forces and bending moments resulting from said transmittal of said transverse forces. Said loads transferring flange is as well designed to transmit circumferential and longitudinal forces and torsional/bending moments resulting from said transmittal of said transverse forces. Said loads transferring flange is provided with at least three flanges. Said edge-frame component is provided with an edge frame transfer section interacting with an edge frame flange of said three flanges of said loads transferring flange. Said beam is provided with at least one beam web transfer section interacting with at least one beam web flange of said three flanges of said loads transferring flange and said outer skin is provided with an outer skin transfer section interacting with an outer skin flange of said three flanges of said loads transferring flange. The inventive loads interface allows transfer of concentrated loads from e. g. a metallic door fitting into an airplane plug-type door structure, composed of a shell-like outer skin and an edge frame of a grid-like bending beam structure, by introduction of tension and torsional loading in the outer skin and an in-plane loading in the beam and edge frame. The inventive loads interface distributes the multi-axial concentrated loads as much as possible in multiple elements, such as said outer skin, being a structural component that—according to the state of the art—has not yet been used to carry any loads from door stops. The inventive loads interface allows easy access and replacement of said loads transferring flange. As a result of the load introduction by in-plane action, metallic suspension structures and brackets used in state-of-the-art (C)FRP airplane door designs can be removed or reduced to a minimum, leading to a reduction of manufacturing steps, time, costs and structural weight. Furthermore, any torque and/or bending moments resulting from forces in circumferential and longitudinal direction that is tending to twist the inventive loads interface with its background structure and flanges will automatically be compensated by counteracting in plane loadings introduced in the edge frame and tension, compression and torsion loads in the outer skin. The inventive loads fitting can be produced similarly to current door fitting designs by simply machining or forging it from metal or by a carbon fiber reinforced plastic injection molded realization.

According to a preferred embodiment of the invention said beam is inclined towards the outer skin and/or said edge frame is inclined towards the outer skin and the beam with the bending beam being inclined with less than 90° to the edge frame, preferably with about 45° for more constructive possibilities.

According to a further preferred embodiment of the invention the beam comprises two beam web transfer sections interacting with at least one beam web flange, preferably two beam web flanges, said two beam web transfer sections being parallel to each other.

According to a further preferred embodiment of the invention the beam comprises at least one single lap-shear joint.

According to a further preferred embodiment of the invention the edge frame is provided with at least one passage for said at least one beam web flange of said loads transferring flange towards the beam web transfer section.

According to a further preferred embodiment of the invention the stiffness of said load transferring flange is adjustable for desired load distribution in background structure components.

According to a preferred embodiment of the invention the loads interface for a concentrated load transfer into/from a structural member is applied to airplane doors & hatches, airplane door surround structures like fuselage-sided door frames, helicopter airframes or helicopter structural parts, airplane cabin floor grids, vehicle body work and other stiffened shell-like structures.

BRIEF DESCRIPTION OF THE SEVERAL VIEWS OF THE DRAWINGS

A preferred embodiment of the invention will be described with reference to the following description and the attached drawings.

DETAILED DESCRIPTION OF THE INVENTION

Figure 1:
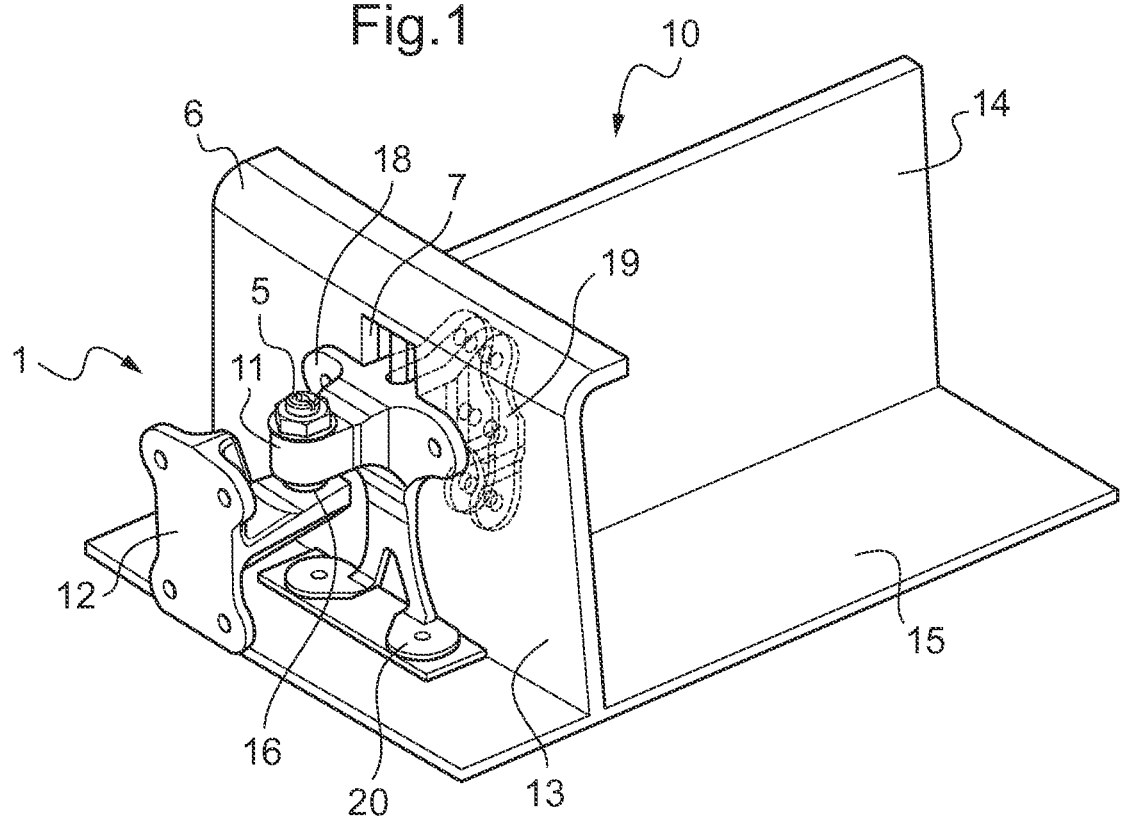
FIG. 1 shows a spherical view of the loads interface according to the invention.

According to FIG. 1 a loads interface 1 comprises a door sided loads transferring flange 11, namely a door stop, detachable supported by a contact point 16 on a fuselage sided loads transferring flange 12, namely a fuselage stop, of an aircraft structure (not shown). The loads transferring flange 11 is mounted to a background structure 10 of a plug type aircraft door with a cylindrical or spherical outer skin 15 with bolts/screws. Transverse concentrated loads are transferred via the loads transferring flange 11 into the aircraft door at closing of the aircraft door and/or due to fuselage deformation and during flight when internal pressure biases the aircraft door against any of the corresponding contact points 16 on the fuselage stops 12. Circumferential and/or longitudinal concentrated loads are transferred via the loads transferring flange 11 into the aircraft door as well due to friction between the screw means 5 and fuselage stops 12 and due to fitting inclination with respect to the outer skin, Hence the transverse, circumferential and/or longitudinal concentrated loads form multi-axial loads. The transverse concentrated loads resulting from a closed aircraft door in a pressurized fuselage result in a bending moment and the circumferential and/or longitudinal concentrated loads due to friction result in a torsional moment at background structure 10 of the aircraft door.

Screw means 5 are provided in said loads transferring flange 11 and a distance of the loads transferring flange 11 with regard to said contact point 16 is adjustable by said screw means 5. Said distance is adjustable rectangular with regard to the outer skin 15 by rotation of said screw means 5 relative to said loads transferring flange 11.

An edge frame 13 is provided with two passages 7 for introduction of two beam web flanges 19 of said loads transferring flange 11 towards two beam web transfer sections 3 of a beam 14, said beam web transfer sections 3 being essentially parallel to each other on opposed sides of the beam 14.

The loads transferring flange 11 comprises three joined flanges 18, 19, 20 angled at about 90° to each other. The three flanges 18, 19, 20 are each provided with openings to allow fixation of the loads transferring flange 11 by means of bolts, rivets or corresponding fasteners (not shown) to the edge frame 13, the beam 14 and the outer skin 15. The loads transferring flange 11 is manufactured of metal or composite material.

The edge frame 13 is angled at about 90° to the outer skin 15 and the beam 14. The edge frame 13, the outer skin 15 and the beam 14 are made of fiber composite material with the fibers directed along their respective transfer sections 2, 3, 4. The edge frame 13 is attached to the outer skin 15 and the beam 14 and the outer skin 15 is mounted to the beam 14.

The transferring flange 11 is replaceable by simply loosening the fixation bolts/screws from the edge frame 13, the outer skin 15 and the beam 14.

Figure 2:
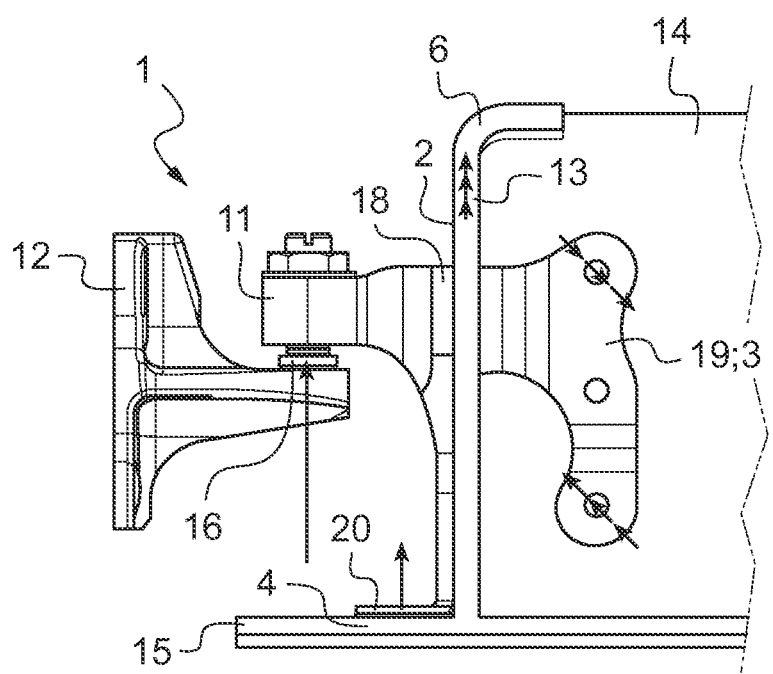
FIG. 2 shows a lateral view of the loads interface according to the invention.

According to FIG. 2 corresponding features are referred to with the references of FIG. 1. The concentrated transverse forces acting on the loads transferring flange 11 will be transferred via the edge frame flange 18 of the loads transferring flange 11 into the edge frame transfer section 2 of the edge frame 13. Any bending moments transmitted by the loads transferring flange 11 are introduced by means of two beam web flanges 19 into the beam web transfer sections 3 of the beam 14 said beam 14 reacting with an in plane loading. A significant share of the loads to said transverse force acts rectangular to the outer skin transfer section 4 of the outer skin 15. Only a part of the loading from the transverse force will be introduced in the edge frame 13 as shear loading, which does not cause delaminations/unfolding in the most critical edge frame curved part 6 of the edge frame 13. The load distribution to the back structure, i.e. edge frame 13, beam 14 and outer skin 15, can be adjusted by adjusting the respective stiffness of any of the three flanges 18, 19, 20 of the loads transferring flange 11.

Figure 3:
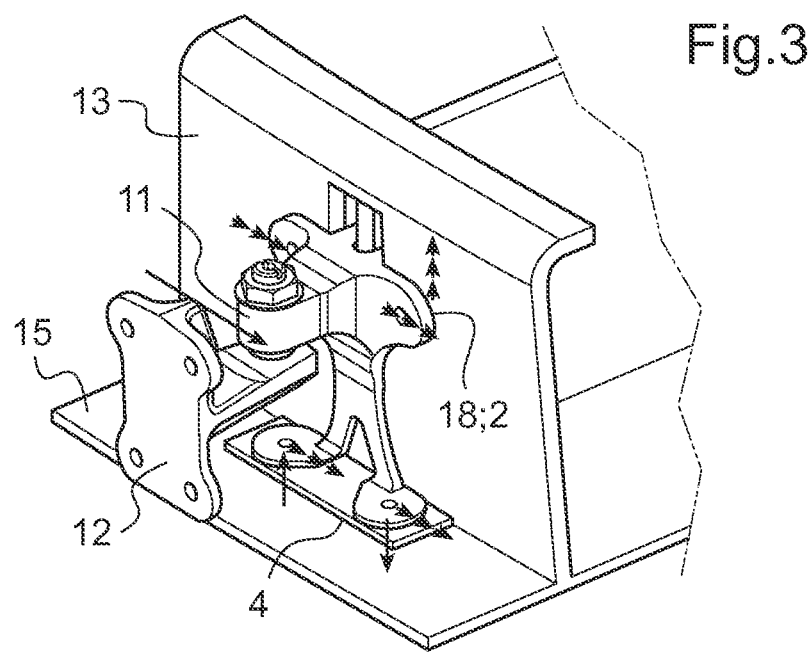
FIG. 3 shows another spherical view of the loads interface according to the invention.

According to FIG. 3 corresponding features are referred to with the references of FIGS. 1 and 2. A circumferential force acting on the loads transferring flange 11 will be transferred via the edge frame flange 18 of the loads transferring flange 11 into the edge frame transfer section 2 of the edge frame 13 and into the outer skin transfer section 4 of the outer skin 15 each with an in plane loading respectively. A resulting bending moment of the loads to said circumferential force acts as a tension/compression force couple out of plane relative to the edge frame 13. A resulting torsional moment of the loads to said circumferential force acts as a tension/compression force couple rectangular to the outer skin transfer section 4 of the outer skin 15.

Figure 4:
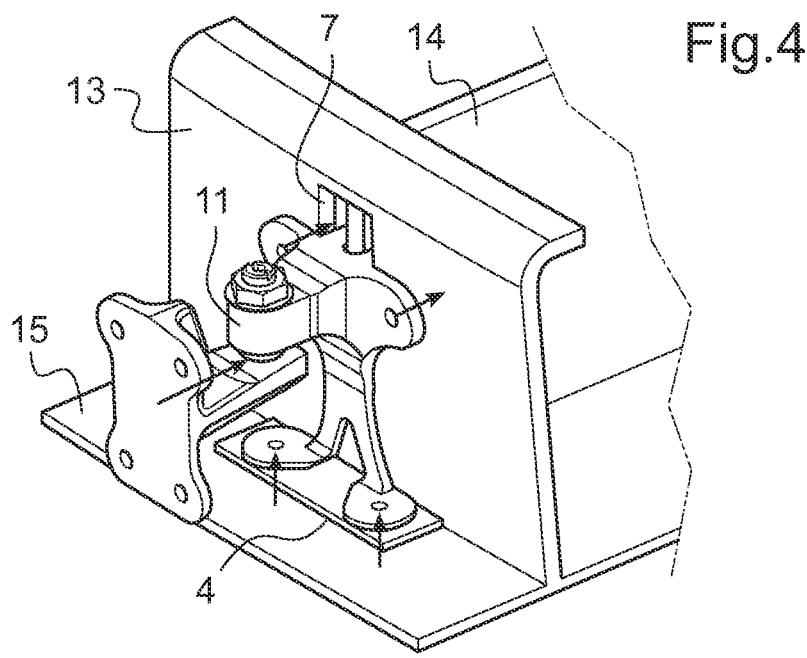
FIG. 4 shows a further spherical view of the loads interface according to the invention.

According to FIG. 4 corresponding features are referred to with the references of FIGS. 1 to 3. A longitudinal force acting on the loads transferring flange 11 will be transferred into the edge frame 13 by compression or tension, in the outer skin 15 with an in plane loading and via the two beam web flanges 19 into the beam web transfer sections 3 of the beam 14 with an in plane loading. Any resulting moment of the longitudinal force will be transferred in the edge frame 13 by compression/tension and in the outer skin 15 by a tension/compression force.

|    | Reference List | Remark |
|----|----------------|--------|
| 1  | Loads Interface | Includes parts 2-20 in FIG. 1 |
| 2  | Edge frame transfer section | Part of 13 |
| 3  | Beam web transfer section | Part of 14 |
| 4  | Outer skin transfer section | Part of 15 |
| 5  | Screw means | |
| 6  | Edge frame curved part | Part of 13 |
| 7  | Passage | Part of 13 |
| 10 | Background structure | Includes parts 13, 14, 15 |
| 11 | Door sided loads transferring flange | |
| 12 | Fuselage sided loads transferring flange | Not shown |
| 13 | Edge frame | Part of 10 |
| 14 | Beam | Part of 10 |
| 15 | Outer skin | Part of 10 |
| 16 | Contact point | Part of 11 |
| 18 | Edge frame flange | Part of Load transferring flange |
| 19 | Beam web flange | Part of Load transferring flange |
| 20 | Outer skin flange | Part of Load transferring flange |

What is claimed is:

1. A loads interface, particularly a loads interface of an aircraft door, comprising:
   a background structure particularly a stiffened shell-like background structure, comprising a beam, an edge-frame component and a shell-like outer skin, preferably made from fiber reinforced plastics, said edge frame being adapted to and connected with said beam and said outer skin and
   a loads transferring flange adapted and mounted to at least said beam,
   wherein:
      said loads transferring flange is designed to transmit transverse forces and bending moments resulting from transferring said transverse forces in said loads transferring flange and/or designed to transmit circumferential and/or longitudinal forces and torsional/bending moments resulting from transferring said circumferential and/or longitudinal forces in said loads transferring flange,
      said loads transferring flange is provided with at least three angled flanges,
      said edge frame is provided with an edge frame transfer section interacting with an edge frame flange of said three flanges of said loads transferring flange,
      said beam is provided with at least one beam web transfer section interacting with at least one beam web flange of said three flanges of said loads transferring flange, and
      said outer skin is provided with an outer skin transfer section interacting with an outer skin flange of said three flanges of said loads transferring flange.

2. The loads interface according to claim 1, wherein said beam is rectangular with regard to said outer skin and said edge frame and said three flanges of said loads transferring flange are essentially rectangular to each other and each of the transfer sections are rectangular to each other.

3. The loads interface according to claim 1, wherein said beam is inclined towards the outer skin and/or said edge frame is inclined towards the outer skin and the beam with the beam being inclined with less than 90° to the edge frame, preferably with about 45°.

4. The loads interface according to claim 1, wherein the beam comprises two beam web transfer sections interacting with at least one angled beam web flange, preferably two beam web flanges of said loads transferring flange, said two beam web transfer sections being essentially parallel to each other.

5. The loads interface according to claim 1, wherein the edge frame is provided with at least one passage for said at least one second flange of said loads transferring flange.

6. The loads interface according to claim 1, wherein the beam comprises at least one single lap-shear joint in the beam web flange of said loads transferring flange.

7. The loads interface according to claim 1, wherein the stiffness of said load transferring flange is adjustable by adjusting the respective stiffness of any of the flanges.

8. The loads interface according to claim 1, wherein its geometry is self-adjusting during assembly.

* * * * *